United States Patent [19]

Holka

[11] Patent Number: 4,969,331
[45] Date of Patent: Nov. 13, 1990

[54] BRAKE MASTER CYLINDER AND BOOSTER ASSEMBLY FOR AUTOMOTIVE VEHICLE

[75] Inventor: Thomas C. Holka, Milford, Mich.

[73] Assignee: Ford Motor Company, Dearborn, Mich.

[21] Appl. No.: 251,422

[22] Filed: Sep. 30, 1988

[51] Int. Cl.$^5$ .............................................. B60T 7/02
[52] U.S. Cl. ...................................... 60/594; 180/90.6
[58] Field of Search ................. 60/533, 547.1, 594, 60/551; 92/140; 180/90, 90.6, 297

[56] References Cited

U.S. PATENT DOCUMENTS

| | | | |
|---|---|---|---|
| 1,941,563 | 2/1934 | Loweke | 60/547.1 |
| 2,018,023 | 10/1935 | Kliesrath | 180/77 |
| 2,073,163 | 3/1937 | Martin | 188/152 |
| 2,152,065 | 3/1939 | La Brie | 60/547.1 |
| 2,328,685 | 9/1943 | Schnell | 188/152 |
| 2,640,324 | 6/1953 | Spahn | 60/547.1 |
| 2,817,410 | 12/1957 | Ayers | 180/90.6 |
| 3,059,434 | 10/1962 | Farmery et al. | 60/551 X |
| 3,173,261 | 3/1965 | Chouings | 60/547.1 |
| 3,714,780 | 2/1973 | Shellhause | 60/594 |
| 4,182,220 | 1/1980 | Fulmer | 91/217 |
| 4,218,887 | 8/1980 | Dauvergne | 60/550 |
| 4,662,237 | 5/1987 | Kami et al. | 60/594 X |

FOREIGN PATENT DOCUMENTS

| | | | |
|---|---|---|---|
| 412965 | 7/1934 | United Kingdom | 60/547.1 |
| 860202 | 2/1961 | United Kingdom | 60/547.1 |
| 2133848 | 8/1984 | United Kingdom | |

Primary Examiner—Edward K. Look
Attorney, Agent, or Firm—Jerome R. Drouillard; Roger L. May

[57] ABSTRACT

A brake master cylinder and booster assembly for an automotive vehicle includes a brake pedal, a booster unit actuated by the brake pedal and having a power-boosted pushrod extending therefrom, a master cylinder unit located adjacent to the booster and having an actuator rod extending therefrom in a direction generally parallel to, but offset from, the booster pushrod, and a linkage operatively connecting the pushrod and the actuator rod so that movement of the brake pedal will be accompanied by power assisted movement of the master cylinder actuator rod.

9 Claims, 1 Drawing Sheet

BRAKE MASTER CYLINDER AND BOOSTER ASSEMBLY FOR AUTOMOTIVE VEHICLE

BACKGROUND OF THE INVENTION

1. Field of the Invention

This invention relates to a master cylinder and booster assembly for an automotive vehicle in which a master cylinder unit and a booster unit are integrated into a package efficient assembly.

2. Disclosure Information

Designers of automotive brake systems are faced with the challenge of packaging the brake master cylinder and booster assembly into the ever more crowded confines of the automotive engine compartment. Conventional automotive braking systems utilize either a vacuum or a hydraulically actuated brake booster and a master cylinder attached to the brake booster. The usual practice is to mount the brake booster to the dash panel of the vehicle so that the booster extends into the engine compartment in a longitudinal direction of the vehicle, with the master cylinder mounted upon the booster assembly and extending still further longitudinally into the engine compartment. This type of construction creates problems with front wheel drive vehicles having engines mounted in the east-west configuration because the engine itself requires so much of the longitudinal space within the engine compartment that little space remains for the brake booster and master cylinder assembly. An example of a type of brake master cylinder and booster assembly in which the master cylinder is stacked upon the booster is disclosed in U.S Pat. No. 4,182,220.

The present invention advantageously overcomes the packaging problems associated with stacking a master cylinder upon a booster by allowing the master cylinder and booster to be mounted side-by-side within the engine compartment. The side-by-side mounting is facilitated by a rocker arm which serves as a linkage to connect the pushrods of the booster and master cylinder units.

Brake system designers have used linkages for many years for the PurPose of actuating dual master cylinders. U.S. Pat. Nos. 1,941,563; 2,152,065; 2,328,685; and 2,640,324 all disclose linkage mechanisms for actuating dual master cylinders.

As shown in U.S. Pat. Nos. 3,173,261 and 4,218,887, linkage devices have been used for actuating remote mounted brake booster devices. The devices shown in the '261 and '887 patents do not, however, transmit brake booster force by means of a linkage.

U.S. Pat. Nos. 2,018,023 and 2,073,163 disclose systems in which remote mounted boosters are employed for the purpose of actuating a clutch and a brake unit respectively. The brake booster unit of the '163 patent is actuated by means of an inertia sensitive valve; the booster is not actuated by the brake pedal. Accordingly, the boost provided by the unit of the '163 patent is available only after braking action has been initiated by the driver in a non-power assisted mode.

It is object of the present invention to provide a compact brake master cylinder and booster assembly for a vehicle.

It is yet another object of the present invention to provide a brake booster unit and master cylinder mounting bracket including a booster unit adapted for mounting to the chassis of a vehicle and a bracket adapted for mounting a master cylinder to said booster unit in a Plurality of locations.

It is yet another object of the present invention to provide a brake master cylinder and booster assembly for an automotive vehicle in which the master cylinder may be mounted in a variety of locations describing a circular locus extending about the booster unit.

It is an advantage of the present invention that a brake master cylinder and booster assembly according to this invention will intrude into the engine compartment of a vehicle to a much lesser extent than do conventional power assisted master cYlinder assemblies.

It is yet another advantage of the present invention that a master cylinder and booster assembly according to this invention could be employed upon both left and right hand drive cars without modification of the booster and master cylinder units.

It is yet another object of the present invention that a master cylinder and booster assembly according to this invention provides an inexpensive alternative to more expensive remote master cylinder brake units.

Other objects, features and advantages of the present invention will become apparent to the reader of this specification.

SUMMARY OF THE DISCLOSURE

A brake master cylinder and booster assembly for an automotive vehicle comprises a brake pedal, a booster unit actuated by the brake pedal and having a power-boosted pushrod extending therefrom, a master cylinder unit located adjacent to said booster and having an actuator rod extending therefrom in a direction generally parallel to, but offset from, said power-boosted pushrod, and linkage means operatively connecting the pushrod and the actuator rod so that movement of the brake pedal will be accompanied by power assisted movement of the master cylinder actuator rod. The booster unit of an assembly according to the present invention may be mounted upon the dash panel or other suitable hardpoint of a vehicle. The master cylinder unit may be mounted either upon the dash panel or upon a bracket extending from the booster unit. The linkage means for operatively connecting the booster pushrod and the master cylinder actuator rod preferably comprises a rocker arm having a first end pivotally mounted to the pushrod and a second end pivotally mounted to the actuator rod, with the rocker arm pivoting about a fulcrum mounted intermediate the first and second ends of the rocker arm. The rocker arm fulcrum may be mounted upon either the booster unit or upon a bracket extending from the booster unit to the master cylinder unit. If desired, the bracket may be fabricated such that the master cylinder and rocker arm may be rotated with respect to the booster unit to any of a plurality of locations. According to another aspect of the present invention, a method for installing a brake master cylinder and booster assembly comprising a master cylinder unit, a booster unit, and a bracket and linkage means adapted for connecting the master cylinder unit to the booster unit in any of a plurality of locations in a vehicle comprises the steps of:
  (i) determining a location for the master cylinder unit with respect to the booster unit;
  (ii) mounting said master cylinder unit to said booster unit in the desired location; and
  (iii) mounting said booster unit to said vehicle.

DESCRIPTION OF THE PREFERRED EMBODIMENTS

Figure 1:
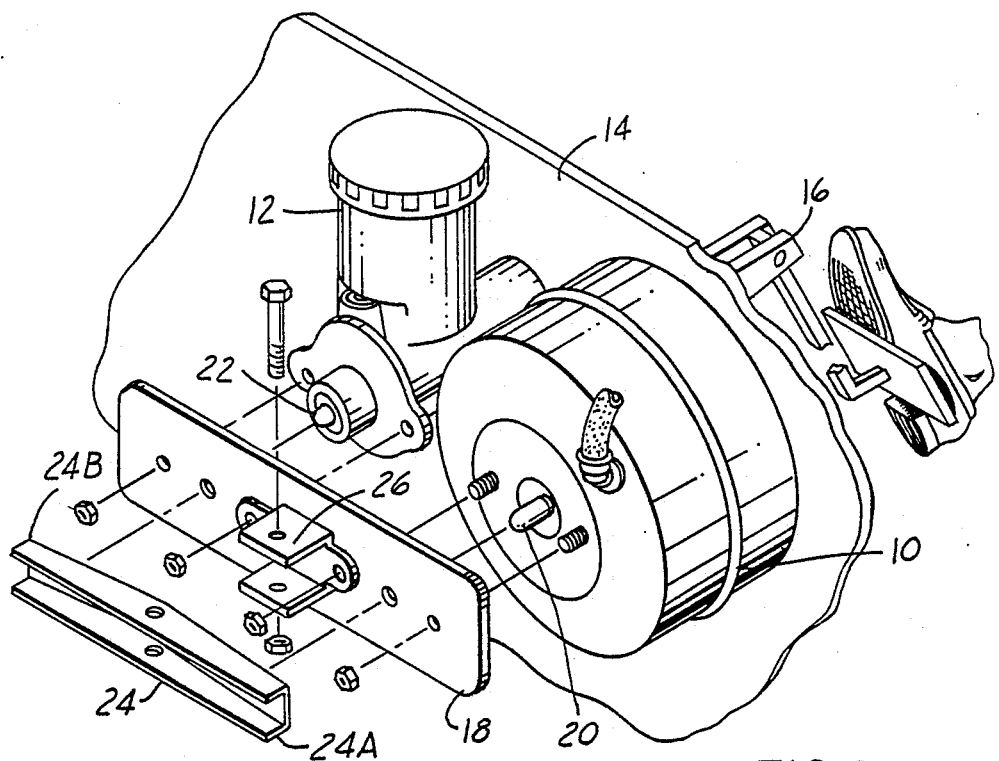
FIG. 1 is a perspective view of a portion of a vehicle including a brake master cylinder and booster assembly according to the present invention.

As shown in FIG. 1, a brake master cylinder and booster assembly according to the present invention includes booster unit 10, which may be mounted directly to dash panel 14 of the vehicle. Those skilled in the art will appreciate in view of this disclosure that booster unit 10 could be mounted to suitable chassis structures other than the dash panel. Booster unit 10 may comprise either a conventional vacuum actuated unit or a conventional hydraulic pressure actuated unit or other types of booster units known to those skilled in the art and suggested by this disclosure. In any event, booster unit 10 is actuated by brake pedal assembly 16 in conventional fashion so that depression of the brake Pedal by the vehicle's driver will result in power assisted movement of booster pushrod 20 in a longitudinally forward direction of the vehicle.

Master cylinder unit 12 comprises a conventional master cylinder which is connected to the front and rear wheel cylinders of the braking system. Master cylinder actuator rod 22 extends from the master cylinder in a direction generally parallel to, but offset from, booster pushrod 20. Master cylinder unit 12 and booster unit 10 are fixed to each other by means of bracket 18, which is shown as being bolted to each unit. The task of operatively connecting booster pushrod 20 and master cylinder actuator rod 22 is borne by rocker arm 24, having a first end, 24A, which is pivotally mounted to booster pushrod 20, and a second end, 24B, which is pivotally mounted to master cylinder actuator rod 22. Those skilled in the art will appreciate in view of this disclosure that although rocker arm 24 is shown as bearing directly upon the hemispherical ends of pushrod 20 and actuator rod 22, pivotal mounting of the rocker arm to the pushrod and actuator rod could be implemented by means of more complex means such as by spherical rod ends or other types of mechanical joints known in the art and suggested by this disclosure. Rocker arm 24 is pivotally mounted at a location intermediate its ends to fulcrum 26 which is mounted upon bracket 18 between booster unit 10 and master cylinder 12. Accordingly, linear motion of booster pushrod 20 is converted by rocker arm 24 into rotary motion which is then reconverted into linear motion of master cylinder actuator rod 22. As a result, depression of the brake pedal will result ultimately in application of the vehicle's brakes.

Figure 2:
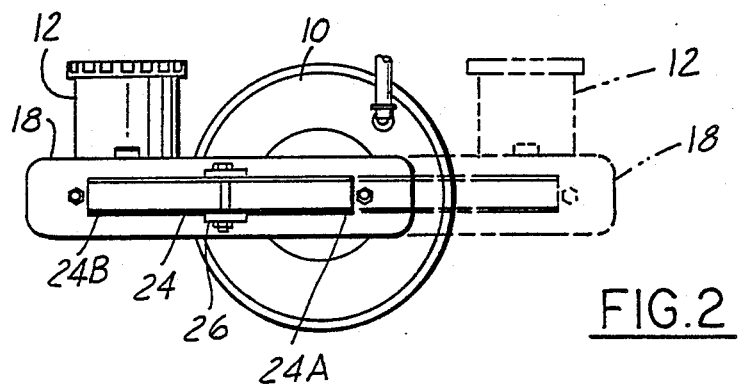
FIG. 2 is a front elevation of a master cylinder and booster assembly according to the present invention, illustrating the variety of locations in which the master cylinder may be mounted with respect to the booster unit.

As shown in FIG. 2, bracket 18 and master cylinder unit 12 may be rotated with respect to booster unit 10 to any of a plurality of locations extending about the booster unit. This permits an assembly according to the present invention to be used in a variety of vehicles having varying amounts of space for location of the master cylinder and booster assembly. For example, a master cylinder and booster assembly according to this invention may be used on both left and right hand drive vehicles by merely mounting the master cylinder unit 12 and bracket 18 at the diametrically opposed locations upon booster unit 10 shown in FIG. 2.

Figure 3:
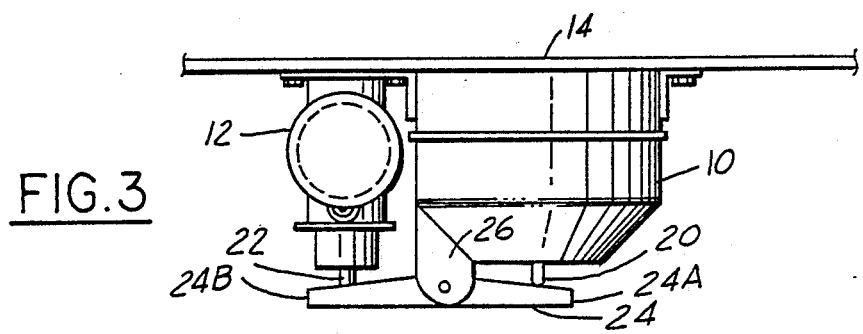
FIG. 3 is a plan view of one embodiment of a master cylinder and booster assembly according to the present invention in which the master cylinder and booster are mounted directly to the dash panel of a vehicle.

In the event that it is desired to provide a brake master cylinder and booster assembly using an absolute minimum amount of space in terms of the longitudinal intrusion of the assembly into the vehicle's engine compartment, the configuration shown in FIG. 3 may be employed. In this configuration, booster unit 10 and master cylinder unit 12 are each mounted directly upon the dash panel of the vehicle. Because bracket 18 is not used with this configuration, rocker arm 24 may be journaled directly upon a fulcrum attached to booster unit 10. In this manner, the intrusion of the master cylinder and booster assembly into the engine compartment will be minimized.

It may thus be seen that a master cylinder and booster assembly according to the present invention may be used in a method for installing such an assembly in a vehicle in which the installer first determines a location for the master cylinder unit with respect to the booster unit and then mounts the master cylinder unit to the booster unit and in the desired location before mounting the booster unit to the vehicle. It should be noted in this regard that master cylinder unit 12 may be positioned at any location about the periphery of booster unit 10 by merely relocating bracket 18 such that rocker arm 24 swivels about its end 24A.

Various modifications will no doubt occur to those skilled in the arts to which this invention pertains All such modifications which basically rely upon the teachings with which this disclosure has advanced the art are properly considered within the scope of this invention as defined by the appended claims.

I claim:

1. A bracket for mounting a brake master cylinder having an actuator rod to a booster unit having a pushrod generally parallel to but offset from said actuator rod in a plurality of locations in a vehicle, comprising:
  a substantially planar plate extending between said master cylinder and said booster unit, said plate including a pair of apertures for receiving said actuator rod and said pushrod therethrough;
  fulcrum means disposed upon said plate; and
  a rocker arm pivotally mounted to said fulcrum means and having a first and operatively associated with said pushrod and a second end operatively associated with said actuator rod so that linear motion of said pushrod is translated by said rocker arm into linear motion of said actuator rod.

2. A brake master cylinder and booster assembly for an automotive vehicle, comprising:
  a brake pedal;
  a booster unit actuated by said brake pedal and having a power-boosted pushrod extending therefrom;
  a master cylinder unit, located adjacent to said booster and having an actuator rod extending therefrom in a direction generally parallel to, but offset from, said power-boosted pushrod;
  linkage means operatively connecting said pushrod and said actuator rod; and
  a bracket interconnecting said booster unit and said master cylinder unit, said linkage means mounted to said bracket so that movement of said brake pedal will be accompanied by power assisted movement of said master cylinder actuator rod.

3. A brake master cylinder and booster assembly according to claim 2, wherein said booster unit is mounted upon the dash panel of said vehicle.

4. A brake master cylinder and booster assembly according to claim 2, wherein said booster unit and said master cylinder unit are mounted upon the dash panel of said vehicle.

5. A brake master cylinder and booster assembly according to claim 2, wherein said linkage means comprises a rocker arm having a first end pivotally mounted to said pushrod and a second end pivotally mounted to said actuator rod, with said rocker arm pivoting about a fulcrum mounted intermediate said first and second ends.

6. A brake master cylinder and booster assembly according to claim 5, wherein said rocker arm fulcrum is mounted upon said booster unit.

7. A brake master cylinder and booster assembly according to claim 5, wherein said master cYlinder unit and said rocker arm fulcrum are mounted upon a bracket extending from said booster unit.

8. A brake master cYlinder and booster assembly according to claim 7, wherein said bracket and said master cylinder unit and said rocker arm may be rotated with respect to said booster unit to any of a plurality of locations.

9. A brake master cylinder and booster assembly for an automotive vehicle, comprising:
 a brake pedal;
 a booster uniter actuated by said brake pedal and having a power-boosted pushrod extending therefrom;
 a master cylinder unit, located adjacent to said booster and having an actuator rod extending therefrom in a direction generally parallel to, but offset from, said power-boosted pushrod; and
 linkage means operatively connecting said pushrod and said actuator rod said linkage means including:
  a substantially planar plate extending between said master cylinder and said booster unit, said plate including a pair of apertures for receiving said actuator rod and said pushrod therethrough;
  fulcrum means disposed upon said plate; and
  a rocker arm pivotally mounted to said fulcrum means and having a first end operatively associated with said pushrod and a second end operatively associated with said actuator rod so that linear motion of said pushrod is translated by said rocker arm into linear motion of said actuator rod.

* * * * *